United States Patent [19]
Baumann

[11] Patent Number: 5,190,776
[45] Date of Patent: Mar. 2, 1993

[54] LOW/NO FAT BAKERY INGREDIENT

[75] Inventor: Vitus W. Baumann, Smithtown, N.Y.

[73] Assignee: Kraft General Foods, Inc., Northfield, Ill.

[21] Appl. No.: 884,352

[22] Filed: May 18, 1992

Related U.S. Application Data

[63] Continuation of Ser. No. 639,636, Jan. 10, 1991, abandoned.

[51] Int. Cl.$^5$ ............................................. A21D 13/08
[52] U.S. Cl. ..................................... 426/94; 426/275; 426/502; 426/603
[58] Field of Search .................. 426/94, 502, 275, 603

[56]      References Cited
U.S. PATENT DOCUMENTS 3,985,911 10/1976 Kriz et al. ............................ 426/602
4,963,386 10/1990 Klemann et al. .................... 426/611

FOREIGN PATENT DOCUMENTS 340035 11/1989 European Pat. Off. .

OTHER PUBLICATIONS

Farmer, Fannie, 1979, The Fannie Farmer Cookbook, 12th Ed. Bantam Books, N.Y. pp. 645, 748, 781.

Primary Examiner—Jeanette Hunter
Assistant Examiner—Helen Pratt
Attorney, Agent, or Firm—Thomas R. Savoie

[57]     ABSTRACT

A low/no fat formulation, which can be used as a replacement for roll-in fat or shortening or as a base for forming a filling for danish rings and twists, containing from 40 to 70% cake crumb material, from 8 to 30% sugar, preferably brown sugar, from 5 to 20% sugar syrup, preferably corn syrup, and from 10 to 30% of a starch-based creme filling. Fat-free cake crumbs are utilized for a no-fat embodiment of this invention.

10 Claims, No Drawings

LOW/NO FAT BAKERY INGREDIENT

This is a continuation of application Ser. No. 07/639,636, filed Jan. 10, 1991 now abandoned.

BACKGROUND OF THE INVENTION

A. Field of the Invention

This invention relates to the formulation and production of a low-fat or fat-free material which is useful as a roll-in ingredient or a filling ingredient in the production of baked goods such as danish pastry, puff pastry, croissants and the like.

Low-fat and fat-free baked goods have recently become quite popular with consumers. The use of fat substitutes in doughs and batters has enabled the production of such low-fat and fat-free baked goods. Low-fat and fat-free, laminated baked goods, however, require not only the formulation of low/no fat doughs but also a low/no fat replacement for various fillings and for the roll-in fat or shortening conventionally used in making laminated products, such as puff pastry, danish pastry, and croissants.

B. Description of the Prior Art

Historically butter and/or margarine has been used as the roll-in ingredient in the production of laminated baked goods. Fat-based pastry shortening, such as described in U.S. Pat. No. 3,985,911 to Kriz et al., have also been formulated to give an untempered, functional pastry shortening having functionality for roll-in pastry applications over a temperature range of from 50° to 90° F. while providing good mouthfeel in the finished baked product.

Prior attempts at producing fat-free baked goods have focused on the use of various fat replacements in the dough formulations used to produce sweet dough products, such as sweet rolls, coffee cakes, and doughnuts and in the batter formulations used to produce products such as cakes and cookies. Such disclosures are present in U.S. Pat. No. 4,963,386 to Klemann et al. and published European Patent Application 340,035 to Chen et al. both of which are hereby incorporated by reference. Neither of these references, however, disclose any low fat or fat-free roll-in formulations which could be used in the production of low/no fat laminated baked goods such as Danish pastry puff pastry and croissants or any low/no fat filling formulation which would be used in the production of low/no fat pastries such as danish strips and rings.

Roll-in material must be capable of being spread into uniform layers when compressed between layers of dough. If the material is too firm or too hard when used, it will tear holes in the dough and cause discontinuities when the dough is folded. If the material is to soft, the material has a tendency to "oil out" or soak into the dough rather than remaining as a distinct layer between two layers of dough.

According to the present invention, a low/no fat roll-in ingredient is described which has good functional characteristics, including good mouthfeel in the finished baked product. Also, utilizing the teachings of this invention it is possible to formulate low/no fat filling formulations.

SUMMARY OF THE INVENTION

A low/no fat ingredient which is suitable for use in producing laminated baked goods, especially low/no fat laminated baked goods, is prepared by combining cake crumbs, sugar, sugar syrup and creme filling. If it is desired to have an ingredient for use in a no-fat baked good it will typically be necessary to utilize fat-free cake crumbs. These ingredients are mixed in order to obtain a smooth paste-like consistency having a moisture content of about 2-20%, preferably 4 to 10%. A desirable water activity for this fat-free ingredient is from about 0.4 to 0.9.

A suitable composition for the fat-free ingredient is from about 40 to 70% cake crumbs, 10-30% of a starch-containing creme filling, 8 to 30% of sugar, preferably brown sugar, and 5 to 20% of sugar syrup. All percents recited herein are, unless otherwise indicated, weight percents. Fillings prepared in accordance with this invention will, in addition, contain amounts of flavoring ingredients such as flavors, spices and/or fruit material; however, in unflavored form the filling composition will have the same formulation as set forth above. When utilized the flavoring ingredients will normally constitute about 1 to 50% of the filling.

As used herein, no-fat or substantially fat-free is meant that the material is free of overtly-added fat materials, such as shortening. Low amounts of fat that would naturally be present in ingredients, such as flour, or glyceride materials, such as monogycerides, which could be present as emulsifiers and/or dough conditioners are not to be excluded by the term no-fat. Baked goods which have a fat content of less than 0.5 grams per serving are considered to be "fat-free".

DETAILED DESCRIPTION OF THE INVENTION

The cake crumbs used in the practice of this invention can be obtained from commercial cakes, with stale or return cake being a ready source of crumbs. Naturally the fat content of the cake must be selected to permit to the desired low/no fat level in the finished laminated baked good. If no-fat cake crumbs are desired, the commercially-available, Entenmann's fat-free golden loaf cake is a ready source of such crumbs. Other types of fat-free cake crumbs should be equally suitable for use in formulating the fat-free ingredient of this invention.

The cake crumbs can be made by passing cake through any suitable grinder; the grind size of the particles is not critical. It has been found preferable to utilize only chemically-leavened cake crumbs for producing a roll-in fat ingredient. Whereas, either chemically-leavened or yeast-leavened cake crumbs may be used when preparing a filling in accordance with this invention.

The sugar component of the roll-in is preferably a granulated brown sugar with a brown sugar characterized as natural (i.e., crystallize from unrefined syrup), light brown sugar being most preferred. Other granular or powdered forms of cane or beet sugar may prove to be useful in combination with or in lieu of granulated brown sugar.

The sugar syrup component is typically a corn-derived syrup, such as one having a 42. D.E. and a solids content of about 80%, this being a readily-available, commercial product. Other syrups such as liquid dextrose, high fructose corn syrup and the like should also be useful.

The creme filling is a cooked, modified cornstarch-based filling, such as those typically used by skilled bakers in the production of eclairs and the like. The filling contains in excess of 50% water, preferably 50 to 70%, sugar and/or bulking agents (e.g., polydextrose) at about 20-40% and modified starch at about 3 to 12%, preferably 4 to 9%. A combination of sugar and polydextrose at levels of about 10–30% and 5 to 20% respectively has proven desirable. The amount of sugar or other sweetener contained in the creme filling component should be adjusted so as not to supply excessive sweetness to the bakery ingredient. Flavors, preservatives and minor amounts of other functional ingredients may also be present. According to a typical creme filling preparation water, polydextrose and preservative are mixed with high agitation in a jacketed cooker to thoroughly dissolve the polydextrose. The starch and other non-sugar dries are then added followed by the sugar. Steam is then supplied to the cooker and agitation is continued in order to attain a temperature of about 200° F. (93.3° C.). The mixture is held at this temperature for about 10 to 15 minutes until the edge of the mix comes to a full boil. Steam is then turned off, flavor is added and mixed and the resulting creme filling is cooled to 80° F. (26.7° C.).

When formulating a roll-in ingredient to be used as a replacement for roll-in fat or shortening a preferred formulation is from 50 to 70% cake crumbs material, 10 to 25% creme filling, 8 to 20% sugar and 5 to 15% sugar syrup. When formulating a filling ingredient to be used as an ingredient in the production of bakery goods such as danish rings and danish twists, the filling should contain, in unflavored form (i.e., absent fruit pieces, fruit puree, flavors, spices, etc.) 40 to 60% cake crumb material, 15 to 30% creme filling, 15 to 30% sugar and 7 to 20% sugar syrup.

To attain the desired consistency and functionality, especially as a roll-in ingredient, the low/no fat bakery ingredient of this invention should be essentially free of gums.

EXAMPLE 1

Four hundred pounds of fat-free, chemically-leavened, yellow cake crumbs are combined with eighty pounds of light brown sugar. These ingredients are mixed in a sigma blade mixer for one minute at a low speed and then for about one minute at high speed until a smooth paste consistency is obtained. Next sixty pounds of corn syrup (42 D.E., 80% solids) are mixed in, using a low speed for 1.5 minutes. Finally, 112 pounds of a creme filling is added and mixed for two minutes at low speed. The resulting paste-like material can serve as a roll-in ingredient in place of butter or margarine in the production of pastry products such as danish rings and the like.

The fat-free cake crumbs for the roll-in were obtained by grinding fat-free loaf cake which was prepared from a batter having the following formulation:

| Ingredient | Weight % |
| --- | --- |
| Fat Replacement* | 9.8 |
| Emulsifiers | 1.5 |
| Sugars | 28.5 |
| Flour | 24.1 |
| Pregelatinized Starch | 0.8 |
| Chemical Leavening Agents | 0.8 |
| Flavors & Colors | 0.6 |
| Liquid Egg Whites | 19.6 |
| Water | 14.2 |
| Preservative | 0.1 |
| *Water | 79.7 |
| MSNF | 12.4 |
| Cereal Fiber | 3.6 |
| Dextrose | 2.3 |
| Xanthan Gum | 1.0 |

-continued

| Ingredient | Weight % |
| --- | --- |
| Guar Gum | 1.0 |

The creme filling component of the fat-free roll-in was composed of the following ingredients:

| Ingredient | Weight % |
| --- | --- |
| Water | 61.04 |
| Polydextrose | 10.31 |
| Pastry Filling* | 9.08 |
| Sugar | 19.42 |
| Preservative | 0.09 |
| Flavor | 0.07 |
| *Modified Cornstarch | 70 |
| Dextrose | 8 |
| Salt | 4 |
| Glucono Delta Lactone | 5 |
| Flavor/Color/Carriers | 10 |
| Sodium Alginate | 2 |

EXAMPLE 2

A fat-free fruit filling suitable for use in the manufacture of fat-free danish pastry was prepared from the following ingredients:

| Ingredient | Weight % |
| --- | --- |
| Fat-Free Cake Crumbs | 45.8 |
| Apple Filling | 24.9 |
| Creme Filling | 12.8 |
| Light Brown Sugar | 9.2 |
| Corn Syrup | 6.9 |
| Flavors/Spice | 0.5 |

The creme filling and corn syrup for this filling was the same materials as used in Example 1. The cake crumbs for this filling were the same as Example 1, but for the use of yeast in lieu of chemical leavening agents.

The filling was prepared by first mixing the cake crumbs, sugar, corn syrup and spice for one minute, followed by addition of the creme filling and flavor and mixing for one minute, followed by addition of the apple filling and mixing for one minute.

Having thus described the invention, what is claimed is:

1. A low-fat or no-fat, laminated baked good containing a roll-in ingredient which, as formulated, is comprised of from 50 to 70% fat-free, chemically-leavened cake crumbs, from 5 to 15% sugar syrup and from 10 to 25% of a starch-based creme filling.

2. The laminated baked good of claim 1 wherein the roll-in ingredient, as formulated, has a smooth, paste-like consistency and a moisture content of about 2 to 20%.

3. The laminated baked good of claim 1 wherein the roll-in ingredient contains from 8 to 20% sugar.

4. The laminated baked good of claim 1 wherein the roll-in ingredient is fat-free.

5. The laminated baked good of claim 1 wherein the baked good is selected from the group consisting of danish pastry, puff pastry and croissants.

6. A low-fat or no-fat baked good containing a fruit filling which, as formulated, in unflavored form consists of from 40 to 60% cake crumbs, from 15 to 30% creme filling, from 15 to 30% sugar and from 7 to 20% sugar syrup.

7. The baked good of claim 6 wherein the cake crumbs contained in the filling are fat-free cake crumbs.

8. The laminated baked good of claim 7 wherein the filling is fat-free.

9. The baked good of claim 6 wherein the baked good is selected from the group consisting of danish pastry, puff pastry and croissants.

10. The baked good of claim 6 wherein the filling, as formulated, further contains from 1 to 50% of flavoring ingredients selected from the group consisting of fruit pieces, fruit puree, flavors, spices and combinations thereof.

* * * * *